United States Patent
Eslami (10) Patent No.: US 10,063,889 B2
(45) Date of Patent: Aug. 28, 2018

(54) IMAGE PROCESSING SYSTEM WITH CONDITIONAL CODING AND METHOD OF OPERATION THEREOF

(71) Applicant: Sony Corporation, Tokyo (JP)

(72) Inventor: Ramin Eslami, Milpitas, CA (US)

(73) Assignee: Sony Corporation, Tokyo (JP)

( * ) Notice: Subject to any disclaimer, the term of this patent is extended or adjusted under 35 U.S.C. 154(b) by 784 days.

(21) Appl. No.: 14/525,611

(22) Filed: Oct. 28, 2014

(65) Prior Publication Data
US 2016/0119623 A1 Apr. 28, 2016

(51) Int. Cl.
| H04N 7/12 | (2006.01) |
| H04N 11/02 | (2006.01) |
| H04N 11/04 | (2006.01) |
| H04N 19/645 | (2014.01) |
| H04N 19/13 | (2014.01) |

(52) U.S. Cl.
CPC ........... H04N 19/645 (2014.11); H04N 19/13 (2014.11)

(58) Field of Classification Search
None
See application file for complete search history.

(56) References Cited

U.S. PATENT DOCUMENTS

| 6,154,493 | A | 11/2000 | Acharya et al. |
| 6,272,180 | B1 | 8/2001 | Lei |
| 6,356,665 | B1 | 3/2002 | Lei et al. |
| 6,546,143 | B1 | 4/2003 | Taubman et al. |
| 6,549,666 | B1 | 4/2003 | Schwartz |
| 6,801,665 | B1 | 10/2004 | Atsumi et al. |
| 6,865,291 | B1 | 3/2005 | Zador |
| 6,891,973 | B1 * | 5/2005 | Atsumi ................ H04N 19/647 375/E7.13 |

(Continued)

FOREIGN PATENT DOCUMENTS

WO   WO-2000049571 A2   8/2000

OTHER PUBLICATIONS

U.S. Appl. No. 14/525,364, filed Oct. 28, 2014, Eslami.

(Continued)

*Primary Examiner* — Sath V Perungavoor
*Assistant Examiner* — Xiaolan Xu
(74) *Attorney, Agent, or Firm* — Haverstock & Owens LLP (57) ABSTRACT

An image processing system, and a method of operation thereof, including: a capture unit for obtaining an input image block; and an image signal processing unit coupled to the capture unit, the image signal processing unit including: a pre-processing module for generating a one-dimensional image block from the input image block, a wavelet transform module, coupled to the pre-processing module, for transforming the one-dimensional image block by wavelet coefficients includes a significant partition and a sub-significant partition identified in the wavelet coefficients, a coding module, coupled to the wavelet transform module, for generating a compressed image block including accessing a variable length coding table based on the significant partition and the sub-significant partition, and an inverse wavelet transform module coupled to the coding module for generating an output image block by performing an inverse wavelet transform on the compressed image block for display on a display device.

15 Claims, 7 Drawing Sheets

(56) References Cited

U.S. PATENT DOCUMENTS

| | | |
|---|---|---|
| 6,965,700 B2 | 11/2005 | Pearlman et al. |
| 7,006,697 B1 | 2/2006 | Gormish et al. |
| 7,120,307 B2 | 10/2006 | Malvar |
| 7,142,722 B2 | 11/2006 | Fukuhara et al. |
| 7,248,735 B2 | 7/2007 | Funakubo |
| 7,308,402 B2 | 12/2007 | Zhou et al. |
| 7,315,651 B2 | 1/2008 | Sakuyama et al. |
| 7,376,279 B2 | 5/2008 | Dekel et al. |
| 7,397,963 B2 | 7/2008 | Schwartz |
| 7,412,102 B2 | 8/2008 | Srinivasan et al. |
| 7,421,137 B2 | 9/2008 | Taubman |
| 7,454,074 B2 | 11/2008 | Dekel et al. |
| 7,492,955 B2 | 2/2009 | Zandi et al. |
| 7,545,988 B2 | 6/2009 | Meeker |
| 7,574,056 B2 | 8/2009 | Funakubo et al. |
| 7,623,577 B2 | 11/2009 | Kim et al. |
| 7,634,145 B2 | 12/2009 | Keith et al. |
| 7,656,561 B2 | 2/2010 | Molgaard et al. |
| 7,949,044 B2 | 5/2011 | Winger et al. |
| 8,265,334 B2 | 9/2012 | Yoo et al. |
| 8,306,340 B2 | 11/2012 | Ceperkovic et al. |
| 8,351,693 B2 | 1/2013 | Hayashi |
| 8,401,082 B2 | 3/2013 | Ye et al. |
| 8,428,379 B2 | 4/2013 | Rane et al. |
| 8,446,947 B2 | 5/2013 | Yu et al. |
| 8,588,536 B2 | 11/2013 | Dikbas et al. |
| 8,861,879 B2 | 10/2014 | Park et al. |
| 2001/0024530 A1 | 9/2001 | Fukuhara et al. |
| 2002/0003905 A1 | 1/2002 | Sato et al. |
| 2002/0118759 A1 | 8/2002 | Enficiaud et al. |
| 2003/0063809 A1 | 4/2003 | Andrew |
| 2003/0123742 A1 | 7/2003 | Zhao et al. |
| 2003/0190042 A1 | 10/2003 | Tagashira et al. |
| 2005/0131660 A1 | 6/2005 | Yadegar et al. |
| 2006/0034525 A1 | 2/2006 | Sakai |
| 2006/0159355 A1 | 7/2006 | Mizuno |
| 2007/0110163 A1* | 5/2007 | Kodama .............. H04N 19/172 375/240.21 |
| 2007/0263234 A1* | 11/2007 | Nacman .................. G06T 3/606 358/1.2 |
| 2008/0253463 A1 | 10/2008 | Lin et al. |
| 2010/0046628 A1 | 2/2010 | Bhaskaran et al. |
| 2010/0085224 A1 | 4/2010 | Monro |
| 2011/0229047 A1 | 9/2011 | Shimauchi et al. |
| 2011/0229048 A1* | 9/2011 | Ikeda ..................... H03M 7/30 382/233 |
| 2011/0292247 A1 | 12/2011 | Gharavi-Alkhansari et al. |
| 2012/0082232 A1* | 4/2012 | Sole Rojals ......... H04N 19/176 375/240.18 |
| 2012/0200669 A1 | 8/2012 | Lai et al. |
| 2012/0307904 A1 | 12/2012 | Yi et al. |
| 2014/0169693 A1 | 6/2014 | Kuo et al. |

OTHER PUBLICATIONS

U.S. Appl. No. 14/525,474, filed Oct. 28, 2014, Eslami.
U.S. Appl. No. 14/525,524, filed Oct. 28, 2014, Eslami.
U.S. Appl. No. 14/525,556, filed Oct. 28, 2014, Eslami.
U.S. Appl. No. 14/525,657, filed Oct. 28, 2014, Eslami.
U.S. Appl. No. 14/526,120, filed Oct. 28, 2014, Eslami.
Pearlman et al., Efficient, Low-Complexity Image Coding with a Set-Partitioning Embedded Block Coder, IEEE Transactions on Circuits and Systems for Video Technology, Nov. 2004, pp. 1219-1235, vol. 14, No. 11, IEEE.

* cited by examiner

IMAGE PROCESSING SYSTEM WITH CONDITIONAL CODING AND METHOD OF OPERATION THEREOF

CROSS-REFERENCE TO RELATED APPLICATION(S)

The present application contains subject matter related to a concurrently filed U.S. Patent Application by Ramin Eslami entitled "IMAGE PROCESSING SYSTEM WITH BITSTREAM REDUCTION AND METHOD OF OPERATION THEREOF". The related application is assigned to Sony Corporation and is identified as U.S. patent application No. 14/525,364, filed Oct. 28, 2014 (now U.S. Pat. No. 9,357,237). The subject matter thereof is incorporated herein by reference thereto.

The present application contains subject matter related to a concurrently filed U.S. Patent Application by Ramin Eslami entitled "IMAGE PROCESSING SYSTEM WITH BINARY DECOMPOSITION AND METHOD OF OPERATION THEREOF". The related application is assigned to Sony Corporation and is identified as U.S. patent application No. 14/525,474, filed Oct. 28, 2014 (now U.S. Pat. No. 9,357,232). The subject matter thereof is incorporated herein by reference thereto.

The present application contains subject matter related to a concurrently filed U.S. Patent Application by Ramin Eslami entitled "IMAGE PROCESSING SYSTEM WITH ARTIFACT REDUCTION MECHANISM AND METHOD OF OPERATION THEREOF". The related application is assigned to Sony Corporation and is identified as U.S. patent application No. 14/525,524, filed Oct. 28, 2014 (now U.S. Pat. No. 9,294,782). The subject matter thereof is incorporated herein by reference thereto.

The present application contains subject matter related to a concurrently filed U.S. Patent Application by Ramin Eslami entitled "IMAGE PROCESSING SYSTEM WITH CODING MODE AND METHOD OF OPERATION THEREOF". The related application is assigned to Sony Corporation and is identified as U.S. patent application No. 14/525,556, filed Oct. 28, 2014 (now U.S. Pat. No. 9,674,554). The subject matter thereof is incorporated herein by reference thereto.

The present application contains subject matter related to a concurrently filed U.S. Patent Application by Ramin Eslami entitled "IMAGE PROCESSING SYSTEM WITH BINARY ADAPTIVE GOLOMB CODING AND METHOD OF OPERATION THEREOF". The related application is assigned to Sony Corporation and is identified as U.S. patent application No. 14/525,657, filed Oct. 28, 2014. (now U.S. Pat. No. 9,591,330). The subject matter thereof is incorporated herein by reference thereto.

The present application contains subject matter related to a concurrently filed U.S. Patent Application by Ramin Eslami entitled "IMAGE PROCESSING SYSTEM WITH JOINT ENCODING AND METHOD OF OPERATION THEREOF". The related application is assigned to Sony Corporation and is identified by as U.S. patent application No. 14/526,120, filed Oct. 28, 2014. The subject matter thereof is incorporated herein by reference thereto.

TECHNICAL FIELD

The embodiments of the present invention relate generally to an image processing system, and more particularly to a system for wavelet-based bitplane coding.

BACKGROUND ART

Existing data networks experience ever-increasing demands on them due to the proliferation of embedded, mobile, and otherwise internet-connected devices. The rapid increase of mobile devices has also placed great demands on wireless data networks. A large part of this increased demand is due to streaming audio or video.

Streaming video and on-line gaming places heavy demands on available bandwidth due to the high volume of data required as well as the performance demands of intense users. Thus, compression of video or audio data becomes necessary in order to minimize the transfer requirements and preserve data quality. Many different data compression codecs (coder-decoder) for audio and video exist, with various levels of efficiency. However, not all codecs are equally efficient, and as wireless networks get more congested, and data usage caps become more common, continuous improvement in compression capabilities, especially for streaming and on-demand video, is desired.

Thus, a need still remains for an improved encoding method. In view of the rapid rise in the consumption of available bandwidth by on-demand video, on-line gaming, and social media, it is increasingly critical that answers be found to these problems. Growing consumer expectations and diminishing opportunities for meaningful product differentiation in the marketplace make it critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The embodiments of the present invention provide a method of operation of an image processing system, including: obtaining an input image block with a capture unit; generating a one-dimensional image block based on the input image block; transforming the one-dimensional image block by wavelet coefficients; identifying a significant partition and a sub-significant partition in the wavelet coefficients; generating a compressed image block by accessing a variable length coding table based on the significant partition and the sub-significant partition; and generating an output image block by decoding the compressed image block for displaying on a display device.

The embodiments of the present invention provide an image processing system, including: a capture unit for obtaining an input image block; and an image signal processing unit coupled to the capture unit, the image signal processing unit including: a pre-processing module for generating a one-dimensional image block from the input image block, a wavelet transform module, coupled to the pre-processing module, for transforming the one-dimensional image block by wavelet coefficients includes a significant partition and a sub-significant partition identified in the wavelet coefficients, a coding module, coupled to the wavelet transform module, for generating a compressed image block including accessing a variable length coding table based on the significant partition and the sub-significant partition, and an inverse wavelet transform module coupled to the coding module for generating an output image block by performing an inverse wavelet transform on the compressed image block for display on a display device.

Certain embodiments of the invention have other steps or elements in addition to or in place of those mentioned above. The steps or element will become apparent to those skilled in the art from a reading of the following detailed description when taken with reference to the accompanying drawings.

BEST MODE FOR CARRYING OUT THE INVENTION

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation.

Where multiple embodiments are disclosed and described having some features in common, for clarity and ease of illustration, description, and comprehension thereof, similar and like features one to another will ordinarily be described with similar reference numerals. The embodiments have been numbered first embodiment, second embodiment, etc. as a matter of descriptive convenience and are not intended to have any other significance or provide limitations for the present invention.

The term "module" referred to herein can include software, hardware, or a combination thereof in the present invention in accordance with the context in which the term is used. For example, the software can be machine code, firmware, embedded code, and application software. Also for example, the hardware can be circuitry, dedicated circuitry for a specific function, a processor, a computer, an integrated circuit, integrated circuit cores, a microelectromechanical system (MEMS), passive devices, environmental sensors including temperature sensors, or a combination thereof The term "unit" referred to herein is specific to a hardware implementation that can be essential due to performance requirements, cost, or area restrictions.

Figure 1:
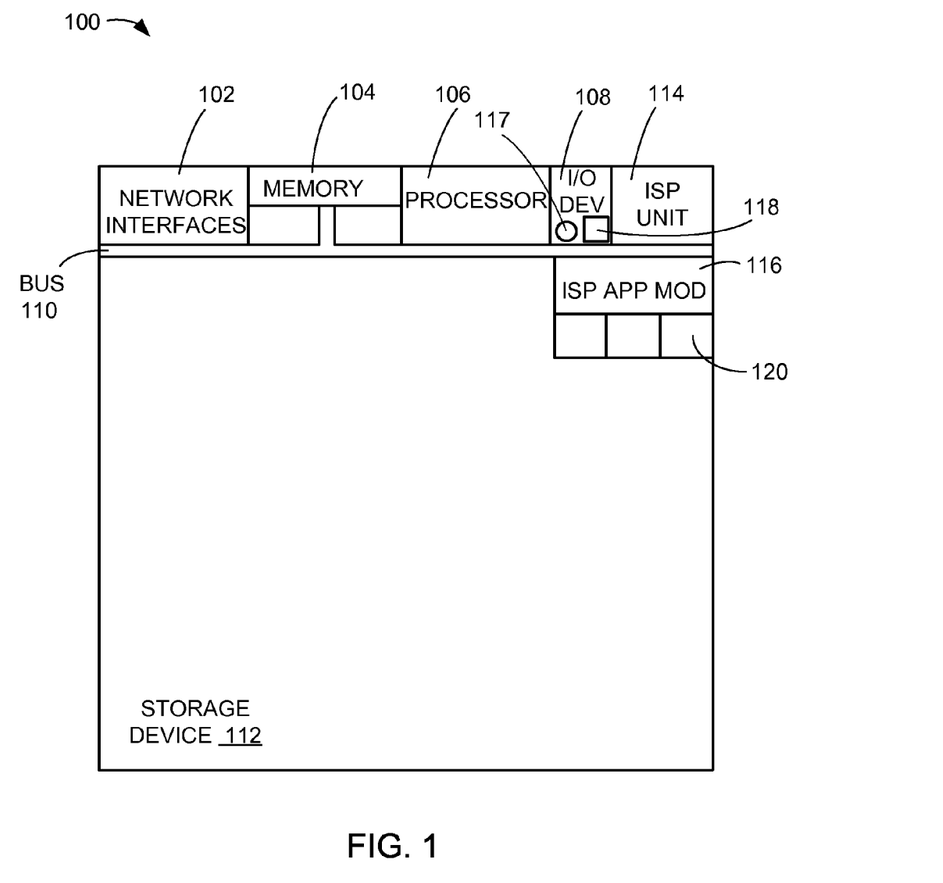
FIG. 1 is an example of a block diagram of an image processing system with conditional coding in a first embodiment of the present invention.

Referring now to FIG. 1, therein is shown an example of a block diagram of an image processing system 100 with conditional coding in a first embodiment of the present invention. The image processing system 100 can be used to acquire, store, compute, communicate, and display information including images and videos.

The image processing system 100 can include a hardware structure implemented with any number of hardware units including network interfaces 102, a memory 104, a processor 106, input/output devices 108, a bus 110, and a storage device 112. An example of the network interfaces 102 can include a network card connected to an Ethernet or other types of local area networks (LAN). As a specific example, the LAN can include Bluetooth, Near Field Communication (NFC), wireless LAN, Long-Term Evolution (LTE), third Generation (3G), and Enhanced Data rates for GSM Evolution (EDGE).

The memory 104 can include any computer memory types. The processor 106 can include any processing unit with sufficient speed chosen for data control and computation operations of the hardware units in the image processing system 100.

The input/output devices 108 can include one or more input/output units including a keyboard, a mouse, a monitor, a display, a printer, a modem, a touchscreen, a button interface, and any other input/output units. The storage device 112 can include any storage units including a hard drive, a compact disc read-only memory (CDROM), a compact disc rewritable (CDRW), a digital video disc (DVD), a digital video disc rewritable (DVDRW), and solid state or flash memory. The storage device 112 and the memory 104 and can be used to store data for processed by any of the units in the image processing system 100.

The image processing system 100 can include functions for image processing of the images and the videos. The image processing functions can be implemented with hardware, software, or any combination thereof. The image processing system 100 can include an image signal processing unit 114 and an image signal processing application module 116.

The image signal processing unit 114 can include any hardware units for processing images including dedicated circuitry, a processor, an integrated circuit, and integrated circuit cores. The image signal processing application module 116 can include software including machine code, firmware, embedded code, or application software.

The image processing system 100 can represent or can be implemented in computing devices having the memory 104, the processor 106, the input/output devices 108, the storage device 112, the image signal processing unit 114, and the image signal processing application module 116. The image signal processing application module 116 can access an image manipulation memory 120 within the storage device 112 for transforming the data from the image signal processing unit 114. For example, the computing devices can include a personal computer, a laptop computer, a computer workstation, a server, a mainframe computer, a handheld computer, a personal digital assistant, a cellular/mobile telephone, a smart appliance, and a gaming console.

Also for example, the computing devices can include a cellular phone, a digital camera, a digital camcorder, a camera phone, a music player, a multimedia player, a video player, a DVD writer/player, a television, a home entertainment system, or any other computing devices. As a specific example, the computing devices can include Cyber-shot® cameras, CMOS sensor Digital Still Cameras (DSC), Handycam camcorders, and single-lens reflex (SLR) cameras. As another specific example, the computing devices can include Point-and-shoot cameras, video camcorders, single-lens reflex (SLR) cameras, mirrorless cameras, and cameras in mobile devices.

The input/output devices 108 can include a capture unit 117. For example, the capture unit 117 can be used to capture video. The input/output devices 108 can also include display devices 118 to display image information. The display devices 118 are units that present visual representations of images or any visual information. The display devices 118 can utilize a variety of display technologies such as LCD, LED-LCD, plasma, holographic, OLED, front and rear projection, CRT, or other display technologies.

The video captured by the capture unit 117 can be considered as a series of images which can further be broken down into input image blocks, for example. The capture unit 117 is shown as connected to the processor 106 and the image signal processing unit 114, but it is understood that the capture unit 117 can be separate from the processor 106. In addition, the processor 106 can be physically separate from the display devices 118. The capture unit 117, the processor 106, and the display devices 118 can all be connected physically or wirelessly, through the network interfaces 102, for example, as required by usage patterns. For example, the capture unit 117 can be a video camera capable of a wired or wireless connection to a display device having the processor 106 and the display devices 118. As another example, the capture unit 117 and certain subunits of the image signal processing unit 114 can be contained within a camera capable of wired or wireless connection to a display device having the remaining subunits of the image signal processing unit 114 and the display devices 118 which can display resulting video.

Regardless of how the capture unit 117, the processor 106, and the display devices 118 are connected, the display devices 118 can output decoded image blocks as decoded video after processing of the input image blocks by the image signal processing unit 114. The quality of the resulting video can be determined by the particular compression scheme used when transmitting image block data, for example.

Figure 2:
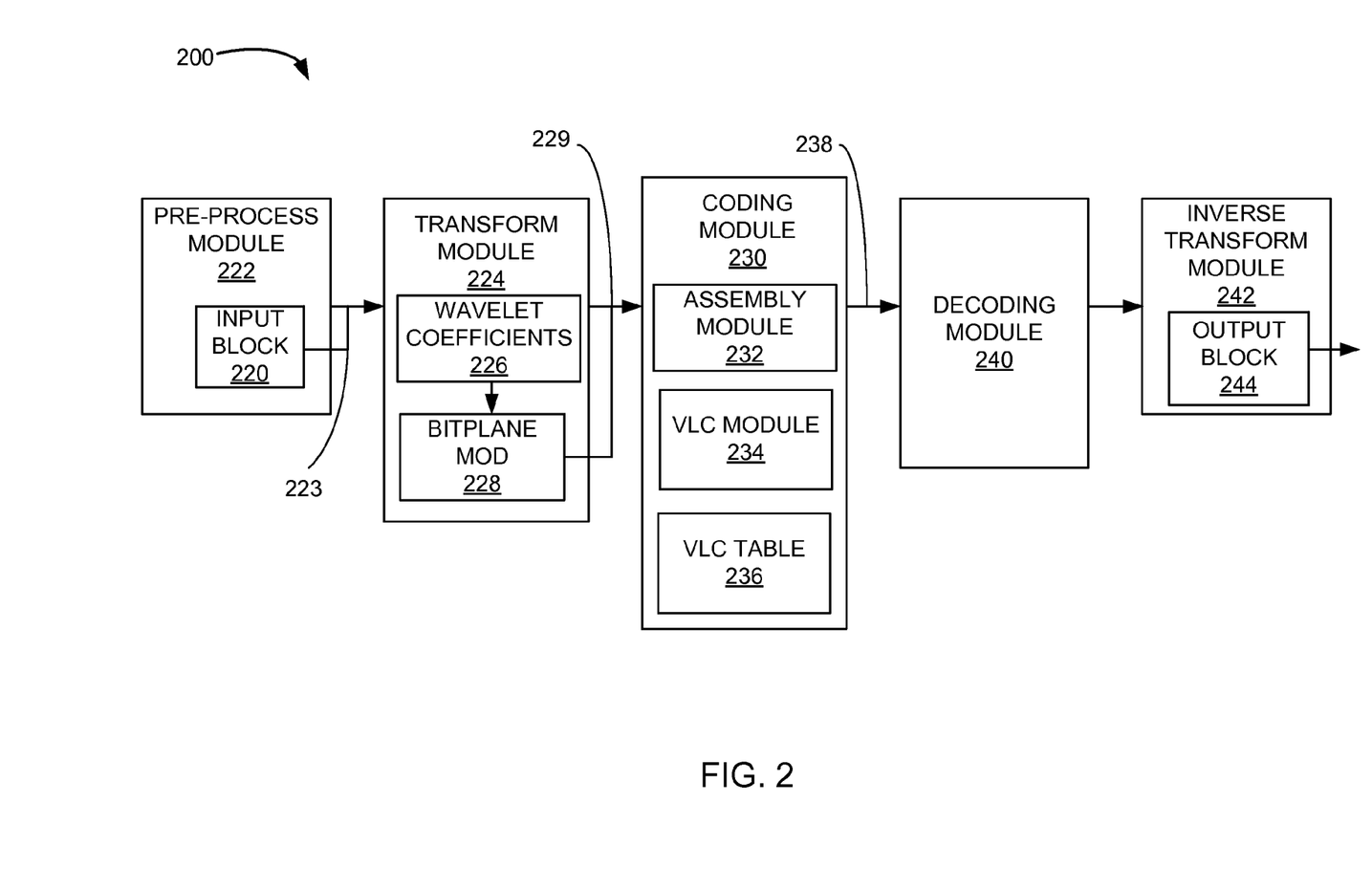
FIG. 2 is a system diagram of the image processing system in a second embodiment of the present invention.

Referring now to FIG. 2, therein is shown a system diagram of the image processing system 200 in a second embodiment of the present invention. In this embodiment, images or video are handled at the level of one-dimensional image blocks, which are selected portions of the images or video captured in an input image block 220 within the storage device 112 of FIG. 1. A one-dimensional image block 223 is generated from the input image block 220 captured by the capture unit 117 of FIG. 1. For example, the one-dimensional image block 223 can be generated by taking a set number of pixels from the input image block 220 by a pre-processing module 222 dividing the captured image information at regular intervals to cover all portions of the input image block 220. By way of an example the one-dimensional image 223 is shown as 32×1 pixels of the input image block 220.

In this example, processing of the one-dimensional image block 223 takes place in the image signal processing unit 114 and in various processing subunits of the image signal processing unit 114. For example, the processing subunits or modules which perform specific functions can be hardware subunits, dedicated circuitry, or modules within the image signal processing unit 114.

The pre-processing module 222 can generate the one-dimensional image block 223 where the pixels of the one-dimensional image block 223 are assigned numbers and arranged in order in what is sometimes called the one-dimensional image block 223. The one-dimensional image block 223 will be described in greater detail in later figures. For example, the one-dimensional image block 223 can be formed from a 32×1 block or a 64×1 block. The color components of the pixels can be used to create separate but related instances of the one-dimensional image block 223. For example, in a YUV 422 formatted image, separate image blocks can contain data for the Y (or luma) channel, the U channel, or V channel (U and V are also considered the chroma channels). The one-dimensional image block 223 can contain data from one or more of the channels; for example, the one-dimensional image block 223 can contain only Y channel information. The pre-processing module 222 allows for easier and faster processing in later steps.

The pre-processing module 222 is coupled to a wavelet transform module 224, which transforms the visual data in the pixels of the one-dimensional image block 223 into wavelet coefficients 226 which can be used to create a bitplane module 228. In order to have the transformation be reversible, integer values of the wavelet coefficients 226 can be used, for example. As a more specific example, Daubechies 5/3 integer wavelets can be used. It has been found that this allows for lossless compression and for the ability to perform simple integer-based calculations, which simplifies calculations and allows for a reduction in hardware cost. The wavelet transform module 224 performs a decomposition step to generate various high pass and low pass sub-bands within the ordered list of the wavelet coefficients 226. The bitplane module 228 can order the wavelet coefficients 226 for each of the one-dimensional image block 223.

The values of each of the significant partitions and sub-significant partitions identified in the wavelet coefficients 226 can be expressed as binary values, or bits. The bits of the wavelet coefficients 226 can be organized into an array with the most significant bits at the top of the array, with less significant bits listed in decreasing priority when going down the array. The array can be subdivided into bitplanes of various significance, with the most significant of the bitplanes at the top of the array. An example of the bitplanes of the wavelet coefficients 226 can be seen in FIG. 4.

The bitplane module 228 can identify significant partitions and sub-significant partitions in the wavelet coefficients 226 for each of the one-dimensional image block 223. The bitplane module 228 can pass the significant partitions and sub-significant partitions as a marked partition 229 for further processing. For Luma, the value of the significant partition can be used to define a context for the sub-significant partition. If the significant partition contains only a single "1" value it represents "Luma Context 0". When the significant partition contains multiple "1" values it represents "Luma Context 1".

The wavelet transform module 224 is coupled to a coding module 230, which can also be considered as a compression module. The coding module 230 can act on the marked partition 229, which contains the significant partitions and sub-significant partitions identified in the wavelet coefficients 226. The coding module 230 can contain submodules including an image assembly module 232 and a variable length coding (VLC) module 234.

The variable length coding (VLC) module 234 can access VLC tables 236 in order to perform the compression of the one-dimensional image block 223. An example of the VLC tables 236 is presented in Table 1 below:

TABLE 1

Variable Length Coding (VLC) Tables

| Luma - Context 0 | | | Luma - Context 1 | | | Chroma | | |
|---|---|---|---|---|---|---|---|---|
| Input | Code | Length | Input | Code | Length | Input | Code | Length |
| 0 | 0 | 2 | 0 | 0 | 3 | 0 | 0 | 2 |
| 1 | 4 | 4 | 1 | 2 | 4 | 1 | 4 | 4 |
| 2 | 5 | 4 | 2 | 3 | 4 | 2 | 5 | 4 |
| 3 | 6 | 4 | 3 | 4 | 4 | 3 | 6 | 4 |
| 4 | 7 | 4 | 4 | 5 | 4 | 4 | 7 | 4 |
| 5 | 8 | 4 | 5 | 6 | 4 | 5 | 8 | 4 |
| 6 | 9 | 4 | 6 | 7 | 4 | 6 | 9 | 4 |
| 7 | 10 | 4 | 7 | 8 | 4 | 7 | 10 | 4 |
| 8 | 11 | 4 | 8 | 9 | 4 | 8 | 11 | 4 |
| 9 | 12 | 4 | 9 | 10 | 4 | 9 | 12 | 4 |
| 10 | 13 | 4 | 10 | 11 | 4 | 10 | 13 | 4 |
| 11 | 28 | 5 | 11 | 12 | 4 | 11 | 28 | 5 |
| 12 | 29 | 5 | 12 | 13 | 4 | 12 | 29 | 5 |
| 13 | 30 | 5 | 13 | 28 | 5 | 13 | 30 | 5 |
| 14 | 62 | 6 | 14 | 29 | 5 | 14 | 62 | 6 |
| 15 | 63 | 6 | 15 | 30 | 5 | 15 | 63 | 6 |

The variable length coding (VLC) module 234 can receive the significant partitions and sub-significant partitions from the bitplane module 228. The significant partition can be used as a context for coding the sub-significant partition. For Luma, if the significant partition has only a single "1" it can establish the context for the coding of the sub-significant partition as Context 0. The entries in Table 1 provide a context 0 for Luma and a context 1 for Luma. The selection of which context is invoked is made by the variable length coding (VLC) module 234, which can determine the context from the significant partition in order to select a coded value from the VLC tables 236.

The variable length coding (VLC) module 234 can pass the coded and compressed information to the image assembly module 232 for ordering and transmission of a compressed image block 238. The compressed image block 238 can contain all of the information derived from the input image block 220.

The coding module 230 can be coupled to a decoding module 240, which reverses the operations of the coding module 230 to decompress the compressed image block 238 sent from the coding module 230 to the decoding module 240. An inverse wavelet transform module 242 can reverse the operations of the wavelet transform module 224 and generate an output image block 244. The output image block 244 can then be displayed on the display devices 118 of FIG. 1. Post processing can be done on the output image block 244 before display as necessary, for example.

It has been discovered that the relationship between the input block 220 and the output block 244 can represent a lossless transfer of the pixel information received by the input device 117 of FIG. 1 when sufficient bitbudget is available. The VLC tables 236 can provide a minimized transfer without losing the quality of the data in the input image block 220.

Figure 3:
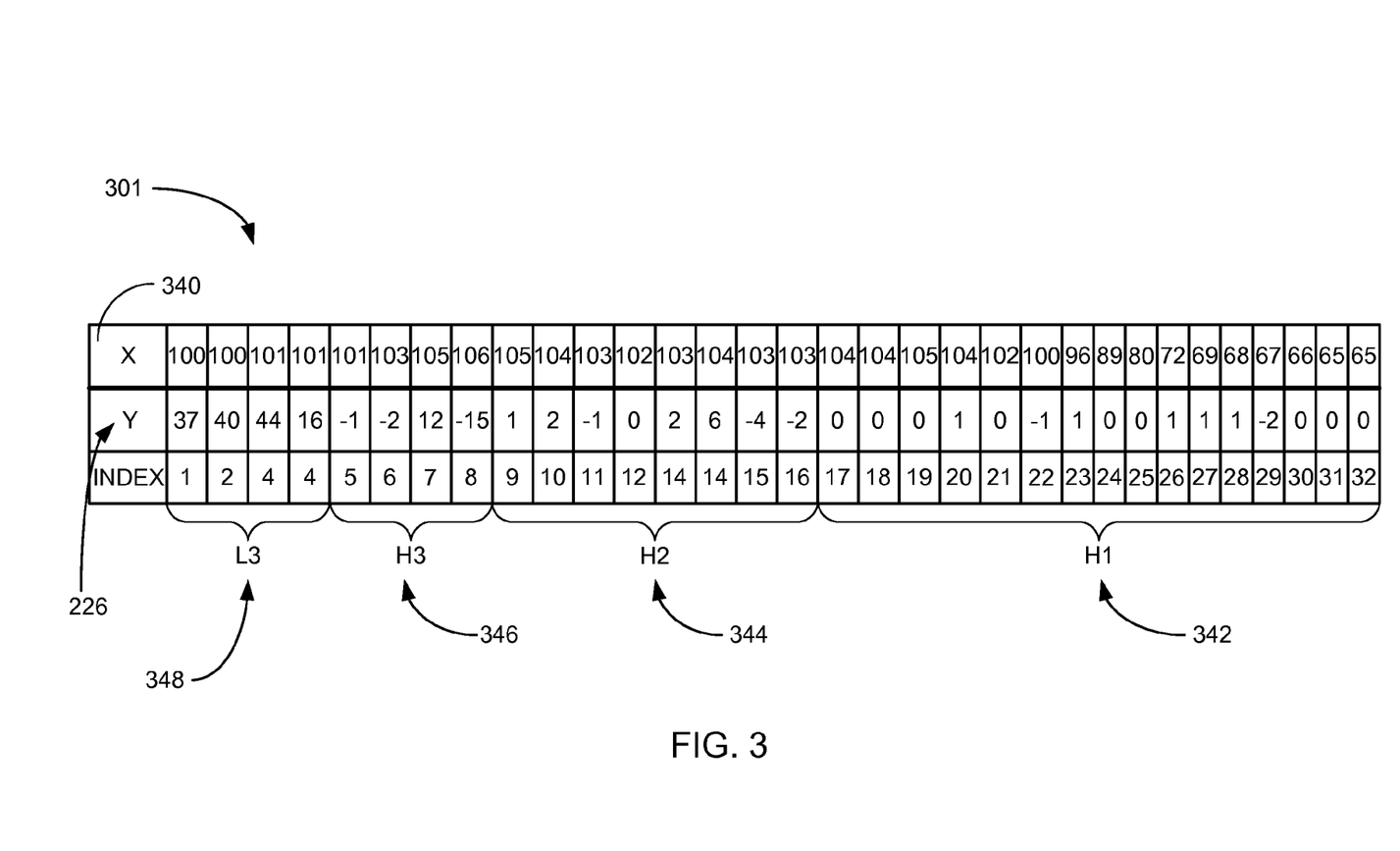
FIG. 3 is an example of a one-dimensional image block register loaded from the input image block of FIG. 2.

Referring now to FIG. 3, therein is shown a one-dimensional image block register 301 loaded from the input image block 220 of FIG. 2. The one-dimensional image block register 301, of the image manipulation memory 120 of FIG. 1, can include a pixel value 340 and the wavelet coefficients 226. It is understood that the numbers are for illustrative purposes only, and that parameters of the marked partition 229 can be modified. For example, while the partition size of the marked partition 229 shown is 4×1 (nominally bits), it is understood that the partition size can be different such as 8×1 or other size as required by the situation.

In this example, the image block 340 is the Luma, or Y component of the visual data. The letter x denotes the intensity value of each pixel within a 0-255 scale, as an example. The letter y designates the wavelet coefficients 226 as determined by the wavelet transform module 224 of FIG. 2. In this example, integer wavelet coefficients are used so a reverse transform is possible. The index number is only a way of tracking the wavelet coefficients 226.

Also shown in this figure are the results of cascading signal decomposition. A level one high pass sub-band 342 is the result of the first decomposition, and is noted by H1. A level two high pass sub-band 344 is the result of a second decomposition step, and is noted by H2. A level three high pass sub-band 346 is the result of a third decomposition, and is noted by H3. A level three low pass sub-band 348 is noted by L3, and is the same size as the level three high pass sub-band 346 as well as being a result of the third decomposition. The particular decomposition pattern is for example only, and it is understood that other types of signal decomposition are possible. It is further understood that the level three high pass sub-band 346 can represent the coarsest high pass sub-band.

Figure 4:
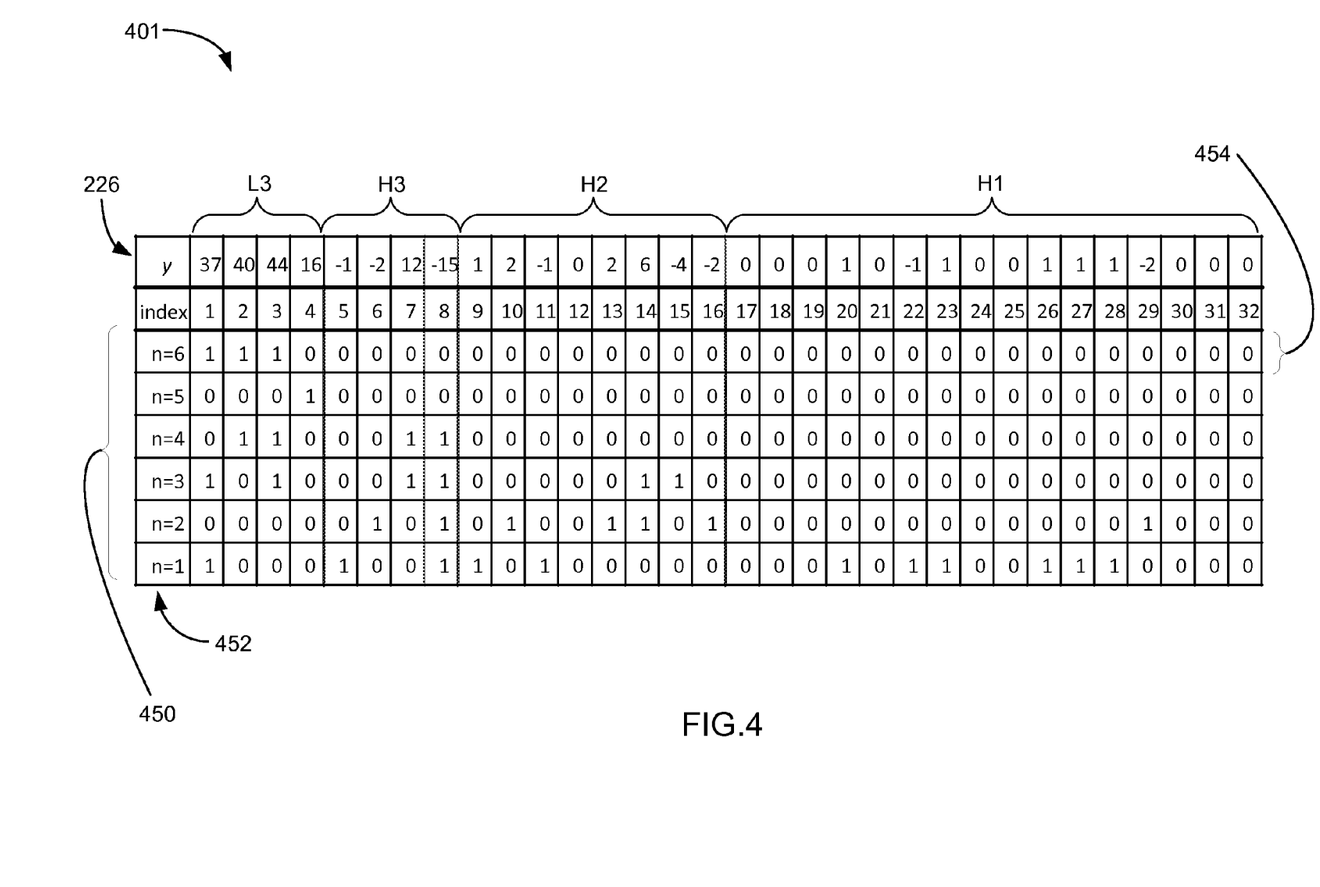
FIG. 4 is an example of the bitplanes of the wavelet coefficients of FIGS. 2 and 3.

Referring now to FIG. 4, therein is shown an example of the bitplanes 401 of the wavelet coefficients 226 of FIGS. 2 and 3. This can be considered as an expanded view of the wavelet coefficients 226, which is the one-dimensional image block 223 of FIG. 2 after going through the wavelet transform module 224 of FIG. 2. As with FIG. 3 the values are for example only. In this example, the index numbers and the wavelet coefficients 226 are shown above bitplanes 450 of the wavelet coefficients 226. The bitplanes 450 are defined as the horizontal rows of bits which represent a portion of the value of the wavelet coefficients 226. In this example, below each of the wavelet coefficients 226 is the binary representation of the value of the wavelet coefficients 226, read from the top to the bottom; for example, the binary value below the wavelet coefficient of "37" corresponding to index number 1 can be read as "100101", which is the binary representation of the number "37".

The n value is a bitplane priority value 452, with lower numbers having lower priority. For example, a most significant bitplane 454 will have the highest value for the bitplane priority value 552; in this example, the most significant bitplane 454 is the horizontal row of bits with the bitplane priority value 452 of 6 (shown as n=6). In this example, this is because 6 bits are necessary to cover all of the existing wavelet coefficient values; it is understood that the number of the bitplanes 450 can change depending on the maximum value within of the wavelet coefficients 226.

Figure 5:
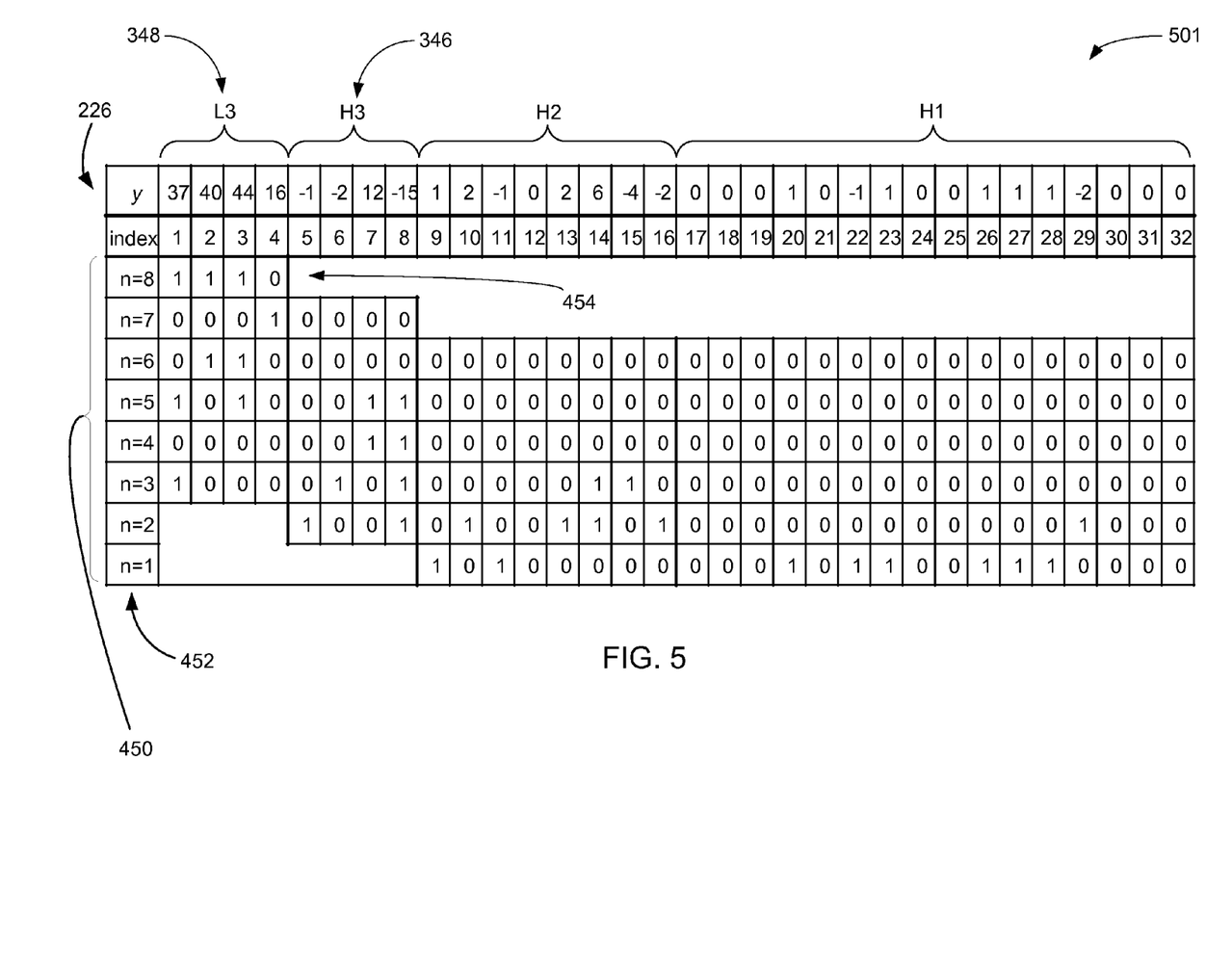
FIG. 5 is an example of a scaled wavelet block of the wavelet coefficients.

Referring now to FIG. 5, therein is shown an example of a scaled wavelet block 501 of the wavelet coefficients 226. This example shows scaling of the bitplanes 450 of the wavelet coefficients 226 of the Y or luma component of the one-dimensional image block 223 of FIG. 2.

In a regular scan of the bitplanes 450 (which could be performed, for example, on the bitplanes 450 seen in FIG. 4), the scan for compression purposes will start from the first bit (generally index number 1) of the most significant bitplane 454 and scan in order across the most significant bitplane 454 (before scaling, this would have been n=6).

Once the end of the most significant bitplane 454 is reached, the scan continues from the first bit of the next bitplane having the bitplane priority value 452 which is one less than that of the most significant bitplane 454. This pattern continues until all bits have been scanned or until the bitbudget is reached.

The scaling of the bitplanes 450 can be performed by the bitplane module 228 of FIG. 2 which can then output the scaled wavelet block 501 for scanning and coding in the coding module 230 of FIG. 2.

When using wavelet coefficients, normal scaling results in non-integer values. In order to have reversible wavelet compression, integer-based wavelets are required. This results in the use of a scaling factor of 1 rather than typical scaling factors; for example, low pass wavelet coefficients can be scaled by the square root of 2, and high pass coefficients could be scaled by 1 over the square root of 2. To have integer-based (reversible) wavelets, the scaling factor of 1 will be used for all of the wavelet coefficients 226.

However, when the scaling factor is changed, the quality of the image blocks after decompression is decreased. For example, the peak signal-to-noise ratio (PSNR) can indicate a decrease in quality. One solution to this problem is to modify scaling of particular wavelet sub-bands. For example, the wavelet coefficients 226 in the level three low pass sub-band 348 can be multiplied by 4, and the wavelet coefficients 226 in the level three high pass sub-band 346 can be multiplied by 2. The result of this multiplication is to "shift" the binary values in the level three low pass sub-band 348 and the level three high pass sub-band 346 up by two bitplanes and one bitplane, respectively, as can be seen in the figure. This increases the bitplane priority value 452 (shown as n=<a number>) of the most significant bitplane 454 (represented in this example as n=8 which becomes the most significant bitplane 454 after scaling) to 8, from a previous value of 6, which can be seen in FIG. 4. This can complete the generation of the scaled bitplanes 501.

Due to the increase in the bitplane priority value 452 for the level three low pass sub-band 348 and the level three high pass sub-band 346, the scan order when performing coding or compression is modified as can be seen in the figure. For example, because all bitplanes of the level three low pass sub-band 348 have had the bitplane priority value 452 increased by two bitplanes, the bits of the wavelet coefficients 226 of the level three low pass sub-band 348 will be scanned earlier than otherwise. It is important to note that because only some of the wavelet sub-bands have been shifted, the bitplane priority value 452 may only have one or two sub-bands rather than all of them. In this example, when the bitplane priority value=8, there are only the bits of the most significant bitplane 454 of the wavelet coefficients 226 in the level three low pass sub-band 348.

It has been discovered that increasing the bitplane priority value 452 of selected wavelet sub-bands largely restores preferred scaling. Because replacing standard scaling factors with a scaling factor of 1 reduces quality due to improper scaling of the wavelet coefficients 226, increasing the bitplane priority value 452 of certain wavelet sub-bands such as the level three low pass sub-band 348 and the level three high pass sub-band 346 can allow for the adjusted scan order to more closely match the scan order one would see in a preferred scaling scheme.

Figure 6:
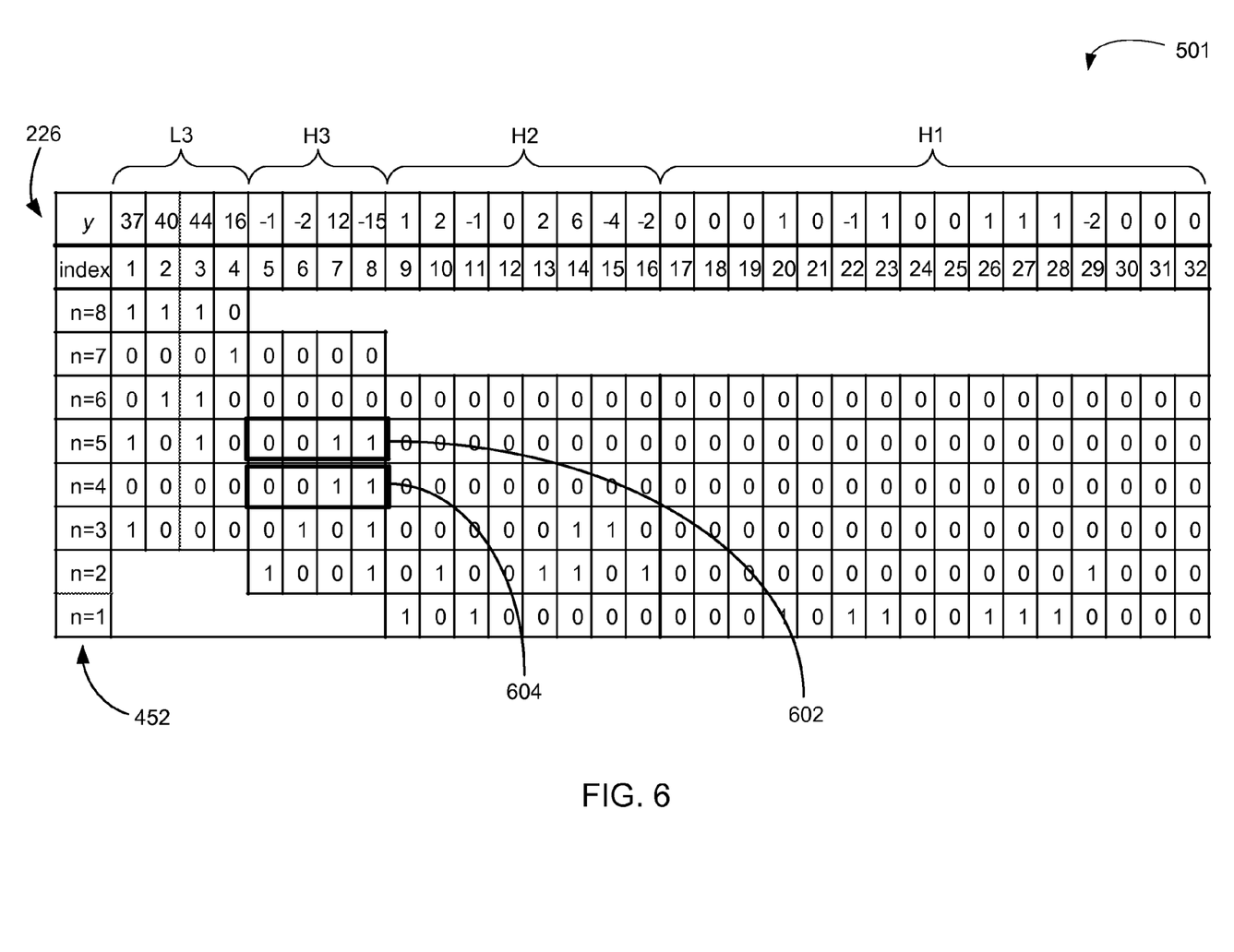
FIG. 6 is an example of the partition identification of the scaled wavelet block.

Referring now to FIG. 6, therein is shown an example of the partition identification of the scaled wavelet block 501. In this example, scanning of the bits of the wavelet coefficients 226 of the scaled wavelet block 501 has identified a significant partition 602 and a sub-significant partition 604.

One of the wavelet coefficients 226 can be identified as the significant partition 602 by the bitplane module 228 of FIG. 2. The bitplane module 228 can parse a partition significance vector (PSV) into 4 values for Luma and 3 values for Chroma. The values can include:

0=an initial value
1=significant partition already coded
2=significant partition detected having context 0
3=significant partition detected having context 1

The values 0-2 are common between Luma and Chroma because Chroma does not support a context 1. For Luma the context 0 indicates that the binary value of the wavelet coefficients 226 in the significant partition 602 contain only a single "1". The binary values that meet this criteria would be 1, 2, 4, and 8. If the significant partition 602 includes multiple of the "1" in the wavelet coefficients 226, the context 1 is indicated. The binary values that meet this criteria would be 3, 5, 6, 7, 9, 10, 11, 12, 13, 14, or 15.

In a second pass operation, the bitplane module 228 can identify the sub-significant partition 604 by reducing the bitplane priority value 452, of the significant partition 602, by one. The bitplane module 228 can transfer the significant partition 602 and the sub-significant partition 604 through the marked partition 229 of FIG. 2 to the VLC module 234 of FIG. 2. The VLC module 234 can determine the context based on the significant partition 602 and utilize the sub-significant partition 604 to retrieve a compressed code from the VLC tables 236.

By way of an example, the significant partition 602 shown has the value "0011", which has multiple of the "1", indicating Luma context 1. The sub-significant partition 604, has a value of "0011" or decimal "3". The VLC module 234 can access the VLC tables 236 for "Luma context 1" to retrieve the compressed code value of "4" with a length of 4.

An embodiment for coding sub-significant partitions can be integrated to the wavelet-based embedded coding schemes such as binary adaptive Golomb (BAG) and binary decomposition codec (BDC) in the significant pass 1 (and 2). It has been shown that the embodiment can improve coding efficiency of BAG and BDC in terms of objective (Peak Signal-to-Noise Ratio value) and subjective quality of the resulting decoded images.

Figure 7:
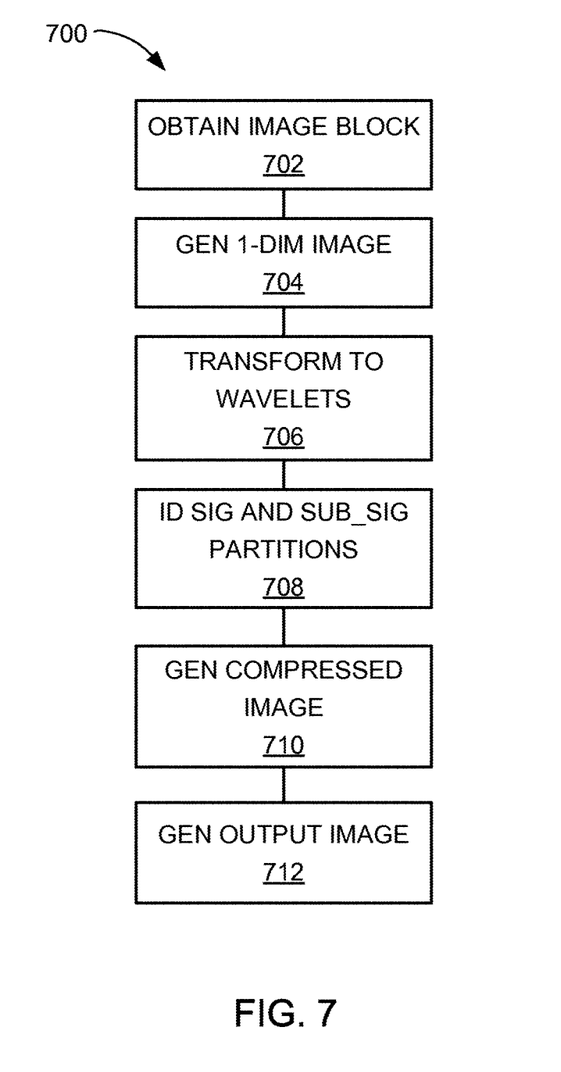
FIG. 7 is a flow chart of a method of operation of an image processing system in a further embodiment of the present invention.

Referring now to FIG. 7, therein is shown a flow chart of a method 700 of operation of an image processing system in a further embodiment of the present invention. The method 700 includes: obtaining an input image block with a capture unit in a block 702; generating a one-dimensional image block based on the input image block in a block 704; transforming the one-dimensional image block by wavelet coefficients in a block 706; identifying a significant partition and a sub-significant partition in the wavelet coefficients in a block 708; generating a compressed image block by accessing a variable length coding table based on the significant partition and the sub-significant partition in a block 710; and generating an output image block by decoding the compressed image block for displaying on a display device in a block 712.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization.

Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hitherto set forth herein or shown in the accompanying drawings are to be interpreted in an illustrative and non-limiting sense.

What is claimed is:

1. A method of operation of an image processing system comprising:
    obtaining an input image block with a capture unit;
    generating a one-dimensional image block based on the input image block;
    transforming the one-dimensional image block by wavelet coefficients;
    identifying a significant partition and a sub-significant partition in the wavelet coefficients;
    generating a compressed image block by accessing a variable length coding table based on the significant partition and the sub-significant partition; and
    generating an output image block by decoding the compressed image block for displaying on a display device, wherein if the significant partition contains a single non-zero value, then a first context is established as a context, and if the significant partition contains a plurality of non-zero values, then a second context is established as the context.

2. The method as claimed in claim 1 wherein generating the one-dimensional image block includes dividing the input image block at regular intervals.

3. The method as claimed in claim 1 wherein transforming the one-dimensional image block by the wavelet coefficients includes ordering bitplanes from the wavelet coefficients.

4. The method as claimed in claim 1 wherein generating the compressed image block includes transforming the significant partition into the context for the sub-significant partition.

5. The method as claimed in claim 1 wherein generating the output image block includes accessing an inverse wavelet transform module.

6. An image processing system comprising:
    a capture unit for obtaining an input image block; and
    an image signal processing unit coupled to the capture unit, the image signal processing unit including:
        a pre-processing module for generating a one-dimensional image block from the input image block,
        a wavelet transform module, coupled to the pre-processing module, for transforming the one-dimensional image block by wavelet coefficients includes a significant partition and a sub-significant partition identified in the wavelet coefficients,
        a coding module, coupled to the wavelet transform module, for generating a compressed image block including accessing a variable length coding (VLC) table based on the significant partition and the sub-significant partition, and
        an inverse wavelet transform module, coupled to the coding module, for generating an output image block by performing an inverse wavelet transform on the compressed image block for display on a display device, wherein if the significant partition contains a single non-zero value, then a first context is established as a context, and if the significant partition contains a plurality of non-zero values, then a second context is established as the context.

7. The system as claimed in claim 6 wherein the pre-processing module for generating the one-dimensional image block includes a storage device accessed by the pre-processing module.

8. The system as claimed in claim 6 wherein the wavelet transform module includes a bitplane module for ordering the wavelet coefficients.

9. The system as claimed in claim 6 wherein the coding module includes a variable length coding (VLC) module for transforming the significant partition into the context for the sub-significant partition.

10. The system as claimed in claim 6 wherein the inverse wavelet transform module is coupled to a decoding module for interpreting the compressed image block based on the VLC table.

11. The system as claimed in claim 6 further comprising a one-dimensional image block register accessed by the wavelet transform module for transforming the one-dimensional image block by wavelet coefficients.

12. The system as claimed in claim 11 wherein the pre-processing module for generating the one-dimensional image block includes a storage device accessed by the pre-processing module includes a 32×1 pixel block read from the storage device.

13. The system as claimed in claim 11 wherein the wavelet transform module includes a bitplane module for ordering the wavelet coefficients and scaling a low pass subband and a coarsest high pass sub-band.

14. The system as claimed in claim 11 wherein a coding module includes a variable length coding (VLC) module for transforming the significant partition into a context for the sub-significant partition and accessing the VLC tables based on the context and the sub-significant partition.

15. The system as claimed in claim 11 wherein the inverse wavelet transform module is coupled to a decoding module for interpreting the compressed image block based on the VLC table and providing the significant partition and the sub-significant partition to the inverse wavelet transform module.

* * * * *